Figure 1:
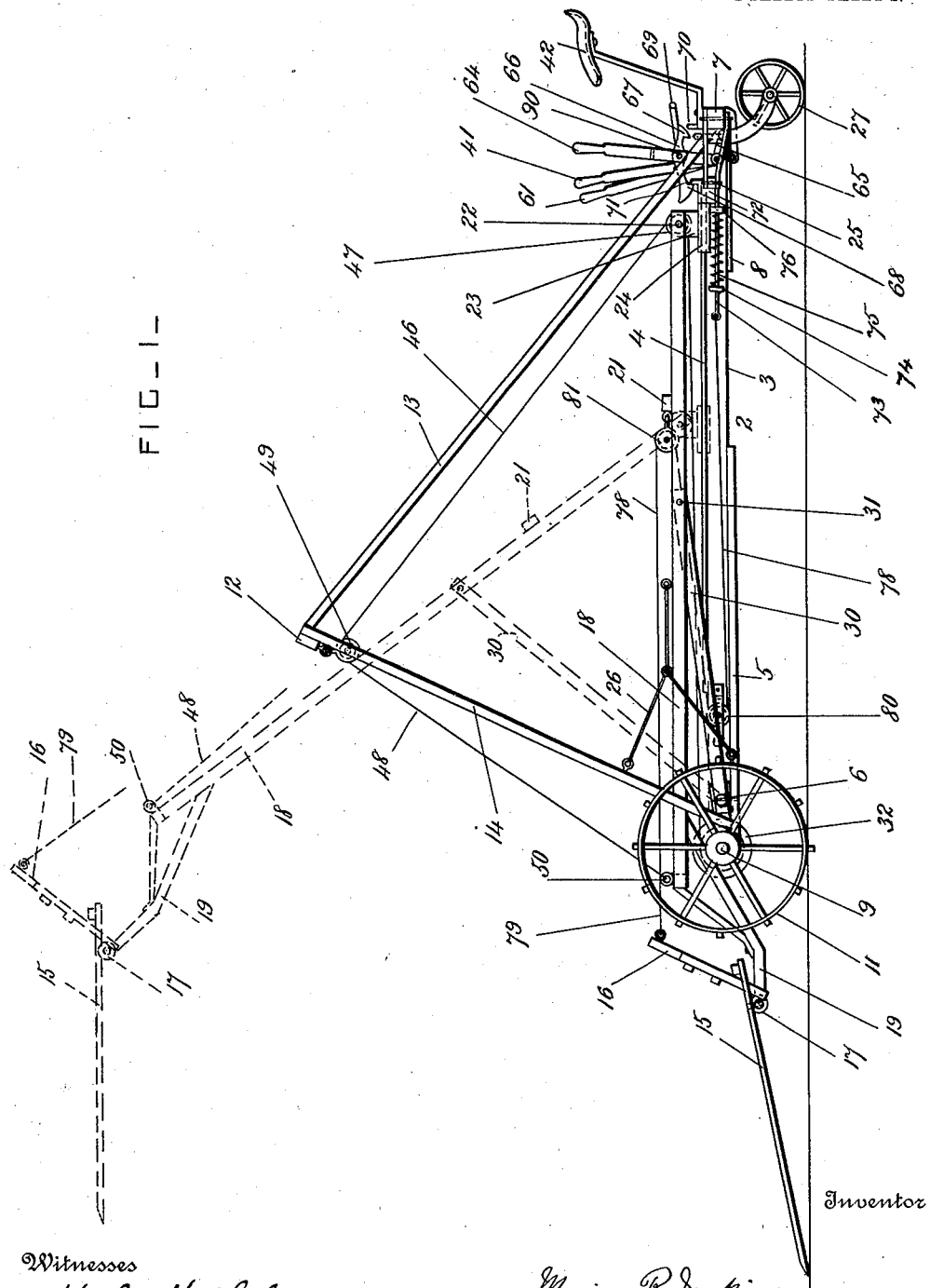

M. R. JENKINS.
HAY RAKE AND STACKER.
APPLICATION FILED FEB. 20, 1913.

1,091,064.

Patented Mar. 24, 1914.

2 SHEETS—SHEET 1.

Witnesses
Karl K. Locke
Marie N. Hurley

Inventor
Marion R. Jenkins
By Hubert W. Jenner.
Attorney

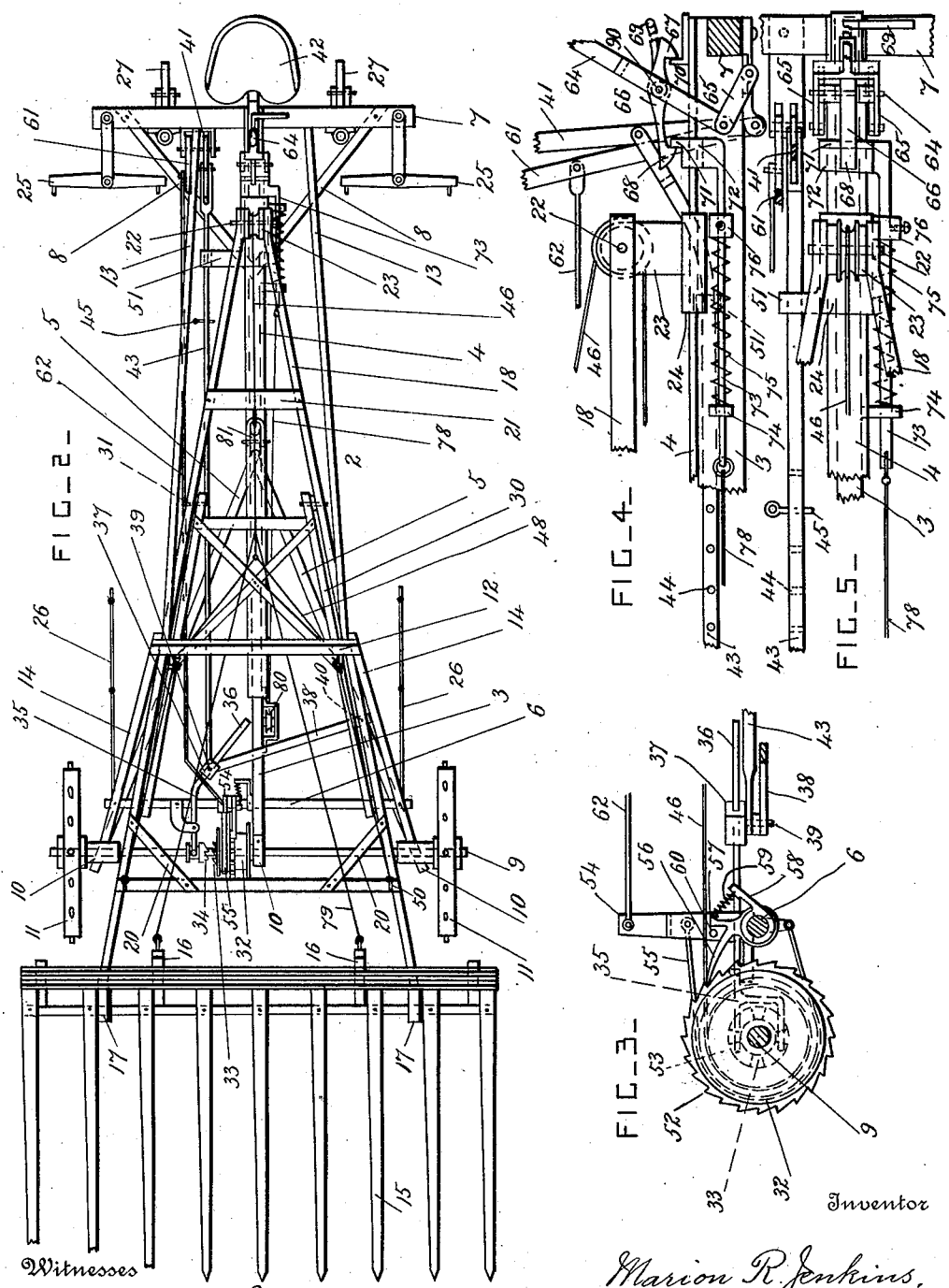

UNITED STATES PATENT OFFICE.

MARION R. JENKINS, OF CHILLICOTHE, MISSOURI.

HAY RAKE AND STACKER.

1,091,064.     Specification of Letters Patent.     Patented Mar. 24, 1914.

Application filed February 20, 1913. Serial No. 749,597.

*To all whom it may concern:*

Be it known that I, MARION R. JENKINS, a citizen of the United States, residing at Chillicothe, in the county of Livingston and State of Missouri, have invented certain new and useful Improvements in Hay Rakes and Stackers; and I do hereby declare the following to be a full, clear, and exact description of the invention, such as will enable others skilled in the art to which it appertains to make and use the same.

This invention relates to machines for raking hay and other similar material and for subsequently raising it and discharging it onto a stack; and it consists in the novel construction and combination of the parts hereinafter fully described and claimed.

In the drawings, Figure 1 is a side view of a hay rake and stacker constructed according to this invention, the position of the hay fork when elevated being shown in dotted lines. Fig. 2 is a plan view of the machine. Fig. 3 is a detail side view of the clutch mechanism, the brake, and the ratchet wheel and pawl. Fig. 4 is a detail side view of the leveling lever and its connections. Fig. 5 is a plan view of the same.

The machine is provided with a main frame 2, having a central longitudinal bar 3, and 4 is a guide rail secured to the upper side of the bar 3 and projecting laterally on each side of it. The frame has also diverging bars 5, the rear ends of which are secured to the middle part of the bar 3, and 6 is a cross bar secured to the front end portions of the bars 3 and 5. A cross bar 7 is also secured to the rear end portion of the bar 3 and is held in position by stays 8.

An axle 9 is provided and is journaled in bearings 10 on the front end portions of the bars 3 and 5, and 11 are ground wheels mounted on the end portions of the axle, and adapted to revolve it as the machine is drawn along. The main frame is also provided with an elevated crossbar 12 which is held in position at its middle part by means of inclined stay-bars 13 and 14 arranged in pairs and having their lower ends secured to the rear crossbar 7 and to the front ends of the bars 5 respectively. The fork 15 is provided with a row of tines, and has upwardly projecting arms 16 at its rear part. The fork is pivoted to eyes 17 on the front end of a lifting frame 18 which is substantially triangular in shape. The eyes 17 are formed on the ends of downwardly cranked arms 19 so that the tines of the fork may be pushed along the surface of the ground. The lifting frame has suitable braces 20 at its front part, and it has a crossbar 21 secured to it a little in front of its rear end.

The rear end of the lifting frame 18 is pivoted by a pin 22 to a forked bracket 23 the lower part of which is provided with a flanged or channel-shaped shoe 24 which engages with the guide rail 4 and is free to slide longitudinally upon it.

Suitable whiffletrees 25, or other draft attachments, are connected to the rear crossbar 7, and links 26 are provided at the front part of the frame 2 for the attachment of the front portions of the harness of the horses which draw the machine along. The rear crossbar 7 is also provided with caster wheels 27 for supporting the rear end portion of the machine.

A radius link or frame 30 is provided and is pivoted at one end by pins 31 to the middle part of the lifting frame 18. The other end of the lifting frame is pivoted on the front crossbar 6. A winding barrel 32 is journaled on the axle 9 and is provided with a clutch member 33. A clutch member 34 is splined on the axle, and is operated by a clutch lever 35 which is pivotally supported by the front crossbar 6.

The clutch lever 35 has a bent rear end portion 36 which is inclined laterally, and 37 is a slide or shoe which is slidable on the inclined portion 36. A guide link 38 is pivoted by a pin 39 to the shoe 37, and the other end of the guide link is pivoted by a pin 40 to the main frame 2.

A hand lever 41 is provided for operating the clutch, and is pivoted to the rear part of the main frame convenient to the seat 42 for the operator, which seat is supported from the rear part of the center bar 3 of the main frame, where the operator can have an unobstructed view of the fork. A rod 43 is pivoted to the hand lever 41 and to the pin 39 on the shoe 37, and is provided with a series of holes 44 for the reception of a tappet pin 45 for operating the clutch automatically, as hereinafter described.

The lifting cord 46, for the fork, is wound at one end upon the barrel 32 and passes over a guide sheave 47, journaled on the pivot pin 22 of the lifting frame, in the forked bracket 23. The other end of the lifting cord has two stretches 48 which are passed over guide sheaves 49, carried by the elevated crossbar 12, and are secured to eyes 50 at the front end portion of the lifting frame. A tappet 51 is secured to the shoe 24, and slides upon the clutch rod 43 and engages with the tappet pin 45.

A ratchet toothed wheel 52 and a brake drum 53 are secured to the winding barrel 32. A brake lever 54 is pivoted on the front crossbar 6 of the main frame, and the brake band 55 is attached to the lever 54 and engages with the brake drum 53. A pawl 56 is also pivoted on the crossbar 6 and is provided with an arm 57.

A stationary arm 58 is secured to the crossbar 6, and 59 is a spring arranged between the arms 57 and 58, and normally holding the pawl in engagement with the ratchet toothed wheel 52. A pin 60 projects laterally from the brake lever in the path of the arm 57, so that the pawl is raised out of engagement with the teeth of the ratchet wheel when the brake is applied. A hand lever 61 is pivoted to the rear part of the main frame for operating the pawl and brake, and 62 is a connecting-rod between the hand lever 61 and the brake lever 54.

A forked hand lever 64 is provided for leveling the tines of the rake or fork after taking the load of hay, and before throwing in the clutch to elevate the fork. This forked lever is arranged to straddle the rear end portion of the center bar 3, and it is pivotally connected to the bar 3 by two similar links 65. A catch 66 is pivoted by a pin 90 in the fork of the lever 64 above the bar 3, and has two latch hooks 67 and 68 arranged on opposite sides of its pivot. The catch has also a foot-plate or foot-pin 69 at its rear end. The rear hook 67 is adapted to engage automatically with a stop lug 70 secured to the bar 3, and the front hook 68 is adapted to engage automatically with a lug 71 on a grooved block or plate 72 which is slidable on the guide bar 3. The block 72 has a rod 73 secured to it and arranged parallel to the bar 3, and slidable in a guide lug 74 which projects from the bar 3. A spring 75 encircles the rod 73, and is interposed between the lug 74 and an adjustable collar 76 on the rod 73, and this spring operates to move the block 72 rearwardly on the bar 3.

The position of the collar is adjusted so as to regulate the strength of the spring. A cord 78 is provided and has two stretches 79 at one end which are secured to the arms 16 of the fork. The main portion of the cord 78 is carried over a guide sheave 80 on the front end portion of the bar 3, and over a guide sheave 81 connected to the crossbar 21 of the lifting frame, and the other end of the cord is secured to the rod 73. The cords 78 and 46 are preferably wire ropes, but any other equivalent flexible connections may be used.

When the parts are in the positions shown in full lines in Fig. 1, the fork is drawn or pushed along the ground to collect a load of hay on it. The hand lever 64 is then retracted to the position shown in Fig. 4, to level the tines. The clutch is then thrown in, and the continued motion of the wheels over the ground revolves the winding barrel and raises the lifting frame and the fork to the position shown by dotted lines in Fig. 1, the catch 66 being released from the stop lug 70 so that it and the block 72 may slide forwardly to a limited extent on the bar 3. The tines of the fork are held substantially horizontal while being raised to the position shown in dotted lines in Fig. 1. The weight of the hay on the tines of the fork turns them pivotally when the fork is being raised, and their downward pivotal movement is controlled by the cord 78 so that the tines are kept substantially horizontal. As the cord 78 passes over the sheaves 80 and 81, and as the sheave 81 moves forwardly and upwardly with the frame 18 and its crossbar 21, while the sheave 80 remains stationary, the upper part of the cord 78 and its two stretches 79 are paid out automatically to a predetermined extent and the arms 16 and the fork tines turn pivotally in the eyes 17. When the tappet 51 strikes the pin 45, or when the lever 41 is pushed forward, the clutch is freed and the barrel stops winding up the fork. The load is dumped on the stack by gravity when the block 72 is released from the catch 66. The spring 75 restores the tines of the fork to a horizontal position as soon as the hay has slid off them. The fork is lowered by means of the brake, the pawl being raised out of engagement with the ratchet toothed wheel while the brake is being operated. When the shoe 24 is slid back to the rear end of the guide rail, by the descending lifting frame, it pushes back the block 72 into reëngagement with the catch on the leveling lever 64. The catch 66 is not placed in engagement with the stop lug 70 until after a load of hay has accumulated on the tines, as it is necessary for the points of the tines to rest on the ground and follow its unevenness. When the tines are leveled by the hand lever the catch 66 is hooked over the stop lug 70 to hold the tines level and enable the operator to have his hand free to operate the clutch lever to start the winding mechanism.

The use of a single central frame bar and guide rail is an important feature in the construction of the machine, as it enables the machine to be built very light and strong and with less liability to being distorted by twisting strains.

Hay lands are rough and are not level, and in the western States they have irrigating ditches cut in them. In passing over such land the wheeled frame of a hay stacker is sprung and twisted back and forth in different directions. When two parallel guide rails are used, the shoes or other parts which engage with such guide rails are frequently gripped by the guide rails when their end portions are twisted in different directions, and the lifting apparatus becomes ineffective and is sometimes broken.

What I claim is:

1. In a rake and stacker, the combination, with a main frame comprising a single central longitudinal bar provided with a guide, and crossbars having their middle parts secured to the end portions of the said bar, leaving their end portions free to spring independent of each other; of ground wheels supporting the end portions of the crossbars, a single shoe engaging with the said guide, a lifting frame pivoted to the said shoe, a fork pivoted to the lifting frame, a radius frame pivoted to the front portion of the main frame and the middle part of the lifting frame, and a lifting tackle for sliding the shoe forwardly to raise the fork.

2. In a rake and stacker, the combination, with a main frame comprising a single central longitudinal bar provided with a guide, a rear crossbar having its middle part secured to the said bar, a front crossbar having its middle part secured to the said bar, and diverging bars having their rear end portions secured to the middle part of the said central bar and their front end portions secured to the free end portions of the front crossbar; of front ground wheels carried by the said central bar and diverging bars and arranged in front of the front crossbar, rear ground wheels carried by the rear crossbar, a single shoe engaging with the said guide, a lifting frame pivoted to the said shoe, a fork pivoted to the lifting frame, a radius frame pivoted to the front portion of the main frame and the middle part of the lifting frame, and a lifting tackle for sliding the shoe forwardly to raise the fork.

3. In a rake and stacker, the combination, with a main frame provided with a longitudinal bar, and a guide rail secured to the said bar; of a shoe slidable on the said guide rail and provided with a tappet; a fork, a lifting frame and a radius frame pivoted together and to the said shoe, an axle provided with ground wheels and journaled in the main frame, a winding barrel, means for driving the said barrel, a clutch for connecting the barrel with its driving means, a pivoted clutch lever provided with a laterally inclined portion, a slide engaging with the said inclined portion, a guide link pivoted to the main frame and to the said slide, a clutch-operating rod pivoted to the said slide and extending alongside the guide rail and provided with a projection arranged in the path of the said tappet, and lifting tackle which raises the fork and slides the shoe along the guide rail.

4. In a rake and stacker, the combination, with a main frame provided with a longitudinal bar, and a guide rail secured to the said bar; of a shoe slidable on the said guide rail; a fork, a lifting frame and a radius frame pivoted together and to the said shoe, a block slidable on the guide rail behind the said shoe, a spring for moving the said block rearwardly, guide sheaves carried by the main frame and lifting frame, a flexible connection passing over the said guide sheaves and connecting the fork with the said block, and a pivoted lever, for leveling the fork, provided with a catch for engaging with the said block.

5. In a rake and stacker, the combination, with a main frame provided with a longitudinal bar; and a guide rail secured to the said bar; of a shoe slidable on the said guide rail; a fork, a lifting frame and a radius frame pivoted together and to the said shoe, a block slidable on the guide rail behind the said shoe and provided with a longitudinal rod, a guide for the said rod secured to the main frame, a collar on the said rod, a spring arranged between the said guide and collar and operating to slide the block rearwardly, guide sheaves carried by the main frame and lifting frame, a flexible connection passing over the said guide sheaves and connecting the fork with the said rod, and a pivoted lever, for leveling the fork, provided with a catch for engaging with the said block.

6. In a rake and stacker, the combination, with a main frame provided with a longitudinal bar, and a guide rail secured to the said bar; of a shoe slidable on the said guide rail; a fork, a lifting frame and a radius frame pivoted together and to the said shoe, a block slidable on the guide rail behind the said shoe, a spring for moving the said block rearwardly, guide sheaves carried by the said main frame and lifting frame, a flexible connection passing over the said guide sheaves and connecting the fork with the said block, a stop secured to the main frame, a lever, for leveling the fork, pivotally connected with the main frame and arranged between the said stop and block, and a catch pivoted to the said lever and adapted to engage with the said stop and with the said block both separately and simultaneously.

7. In a rake and stacker, the combination, with a main supporting frame provided with a single longitudinal guide, of a slidable shoe engaging with the guide, a substantially triangular lifting frame provided with diverging side bars and having its narrow end or apex pivotally connected to the said shoe, a fork pivoted to the wide end of the lifting frame, a radius frame pivoted to the front portion of the main frame and the middle part of the lifting frame, and means for sliding the shoe so as to raise the fork.

8. In a rake and stacker, the combination, with a main supporting frame provided with a single longitudinal guide, of a slidable shoe engaging with the guide a lifting frame pivotally connected to the said shoe, a fork pivoted to the lifting frame, a radius frame pivoted to the front portion of the main frame and to the middle part of the lifting frame, and means for sliding the shoe so as to raise the fork.

In testimony whereof I have affixed my signature in the presence of two witnesses.

MARION R. JENKINS.

Witnesses:
  WILLIAM J. OLENHOUSE,
  R. F. McNALLY.

---

Copies of this patent may be obtained for five cents each, by addressing the "Commissioner of Patents, Washington, D. C."